US012760860B1

(12) United States Patent
Wang

(10) Patent No.: US 12,760,860 B1
(45) Date of Patent: Oct. 13, 2026

(54) AUTOMOTIVE LIGHTING APPARATUS WITH DISPLAY SCREEN

(71) Applicant: NOVSIGHT LIGHTING TECHNOLOGY INC., Irvine, CA (US)

(72) Inventor: Shitao Wang, Guangzhou (CN)

(73) Assignee: NOVSIGHT LIGHTING TECHNOLOGY INC., Irvine, CA (US)

( * ) Notice: Subject to any disclaimer, the term of this patent is extended or adjusted under 35 U.S.C. 154(b) by 0 days.

(21) Appl. No.: 19/373,718

(22) Filed: Oct. 30, 2025

(30) Foreign Application Priority Data

Oct. 22, 2025 (CN) ........................ 202511516496.2

(51) Int. Cl.

| | |
|---|---|
| ***F21S 43/00*** | (2018.01) |
| ***B60Q 1/50*** | (2006.01) |
| ***F21S 43/14*** | (2018.01) |
| ***F21S 43/19*** | (2018.01) |
| ***F21S 45/47*** | (2018.01) |
| *B60Q 1/00* | (2006.01) |
| *F21W 103/55* | (2018.01) |
| *F21W 103/60* | (2018.01) |
| *F21Y 115/10* | (2016.01) |

(52) U.S. Cl.
CPC .............. *F21S 43/601* (2024.05); *B60Q 1/50* (2013.01); *B60Q 1/5035* (2022.05); *F21S 43/14* (2018.01); *F21S 43/195* (2018.01); *F21S 45/47* (2018.01); *B60Q 1/0023* (2013.01); *F21W 2103/55* (2018.01); *F21W 2103/60* (2018.01); *F21Y 2115/10* (2016.08)

(58) Field of Classification Search
CPC ........ B60Q 1/50; B60Q 1/5035; F21S 43/601
See application file for complete search history.

(56) References Cited

U.S. PATENT DOCUMENTS

| | | | | |
|---|---|---|---|---|
| 10,967,799 | B2 * | 4/2021 | Messenger | F21S 41/285 |
| 11,629,839 | B2 * | 4/2023 | Sullivan | F21V 5/004 362/465 |
| 12,359,785 | B2 * | 7/2025 | Lu | F21S 43/145 |
| 2017/0305332 | A1 * | 10/2017 | Albou | B60Q 1/545 |
| 2017/0305336 | A1 * | 10/2017 | Parkes | G09F 27/005 |
| 2019/0168663 | A1 * | 6/2019 | Nykerk | B60Q 1/5037 |
| 2019/0270403 | A1 * | 9/2019 | Sobecki | G03B 21/2033 |
| 2020/0101893 | A1 * | 4/2020 | Studeny | B60Q 1/5035 |
| 2022/0355730 | A1 * | 11/2022 | Singh | B60Q 1/5037 |
| 2023/0406192 | A1 * | 12/2023 | Choi | B60Q 5/006 |
| 2024/0302017 | A1 * | 9/2024 | Groene | G09F 9/3023 |
| 2025/0362000 | A1 * | 11/2025 | Chen | F21S 41/645 |

* cited by examiner

*Primary Examiner* — James R Greece
*Assistant Examiner* — Michael Chiang
(74) *Attorney, Agent, or Firm* — Jose Cherson Weissbrot

(57) ABSTRACT

The present disclosure relates to an automotive lighting apparatus, comprising: a lamp housing; and a basic lighting module, arranged within the lamp housing and electrically connected to an automotive power supply, configured to respond to vehicle status signals from the vehicle main control system for providing road lighting and vehicle status display; and a display screen, arranged within the lamp housing and electrically connected to the basic lighting module, configured to respond to command signals from user terminal control.

18 Claims, 7 Drawing Sheets

AUTOMOTIVE LIGHTING APPARATUS WITH DISPLAY SCREEN

CROSS-REFERENCE TO RELATED APPLICATIONS

The present application claims priority to Chinese Patent Application No. 2025115164962, titled “Automotive Lighting Apparatus” filed on Oct. 22, 2025, the content of which, including amendments thereof, is incorporated herein by reference in its entirety.

TECHNICAL FIELD

The present disclosure relates to the field of automotive technology, particularly to an automotive lighting apparatus.

BACKGROUND

The “visual design” of traditional circular automotive daytime running lights is fixed upon leaving the factory and cannot be altered. Specific manifestations include: 1. Limited visual expression: each daytime running light on a vehicle can only display a preset, static light guide strip or LED arrangement pattern (such as a light arc or a few dots), lacking dynamic effects and personalized expression capabilities; 2. High cost for upgrades and changes: to alter the visual design, the entire optical component (e.g., light guide strip, trim frame) must be replaced, requiring new mold manufacturing, which makes the cost and timeline unacceptable for user upgrades or minor model updates by automakers; 3. Weak functionality and interactivity: the fixed visual design is limited to basic lighting and indication functions, unable to convey richer information (such as welcome animations, driving status prompts, or environmental interactions), restricting the potential of vehicle lights as intelligent and human-machine interaction interfaces.

U.S. Patent US20150366020A1 discloses a lighting apparatus integrating rotatable LED illumination with directional sound, designed to address the limitations of traditional lighting by providing adjustable and therapeutic lighting solutions, thereby enhancing user experience and device functionality. However, even in this solution, the design of daytime running lights remains relatively simplistic, offering only basic lighting and indication functions, and lacking dynamic effects and personalized expression capabilities.

SUMMARY

The present disclosure provides an automotive lighting apparatus to solve the problems raised in the background art.

To achieve the above object, the present disclosure adopts the following technical solutions:

An automotive lighting apparatus comprises a lamp housing; a basic lighting module arranged within the lamp housing and electrically connected to an automotive power supply, configured to respond to vehicle status signals from a vehicle main control system for providing road lighting and vehicle status display; and a display screen arranged within the lamp housing and electrically connected to the basic lighting module, configured to respond to command signals from a user terminal control to display dynamic visual content independently of the vehicle status signals.

An automotive lighting apparatus comprises a lamp housing; a basic lighting module located inside the lamp housing and electrically connected to the automotive power supply, configured to respond to vehicle status signals from a vehicle main control system for providing road lighting and vehicle status display; and a display screen located inside the lamp housing and electrically connected to the basic lighting module, configured to execute preset command signals to display dynamic visual content independently of the vehicle status signals.

An automotive lighting apparatus comprises a lamp housing; a basic lighting module arranged inside the lamp housing, configured to respond to vehicle status signals from a vehicle main control system for providing road lighting and vehicle status display; and a display screen arranged inside the lamp housing, configured to execute preset command signals to display dynamic visual content independently of the vehicle status signals. The display screen is provided with a through hole, and at least part of light emitted by the basic lighting module passes through the through hole.

The beneficial effects of the present disclosure compared to the prior art are as below:

Dynamic content display is achieved through a ring-shaped display screen, enhancing customization capabilities. A dual-signal-source control mode ensures electrical signal priority, avoiding control conflicts. The optimized heat dissipation structure extends component lifespan. Modular design simplifies installation and improves adaptability.

BRIEF DESCRIPTION OF DRAWINGS

The drawings, which form part of this application, are intended to provide further understanding of the present disclosure. The illustrative embodiments and the descriptions thereof are used to explain the present disclosure and do not constitute undue limitations thereof. In the drawings.

REFERENCE SIGNS

Figure 1:
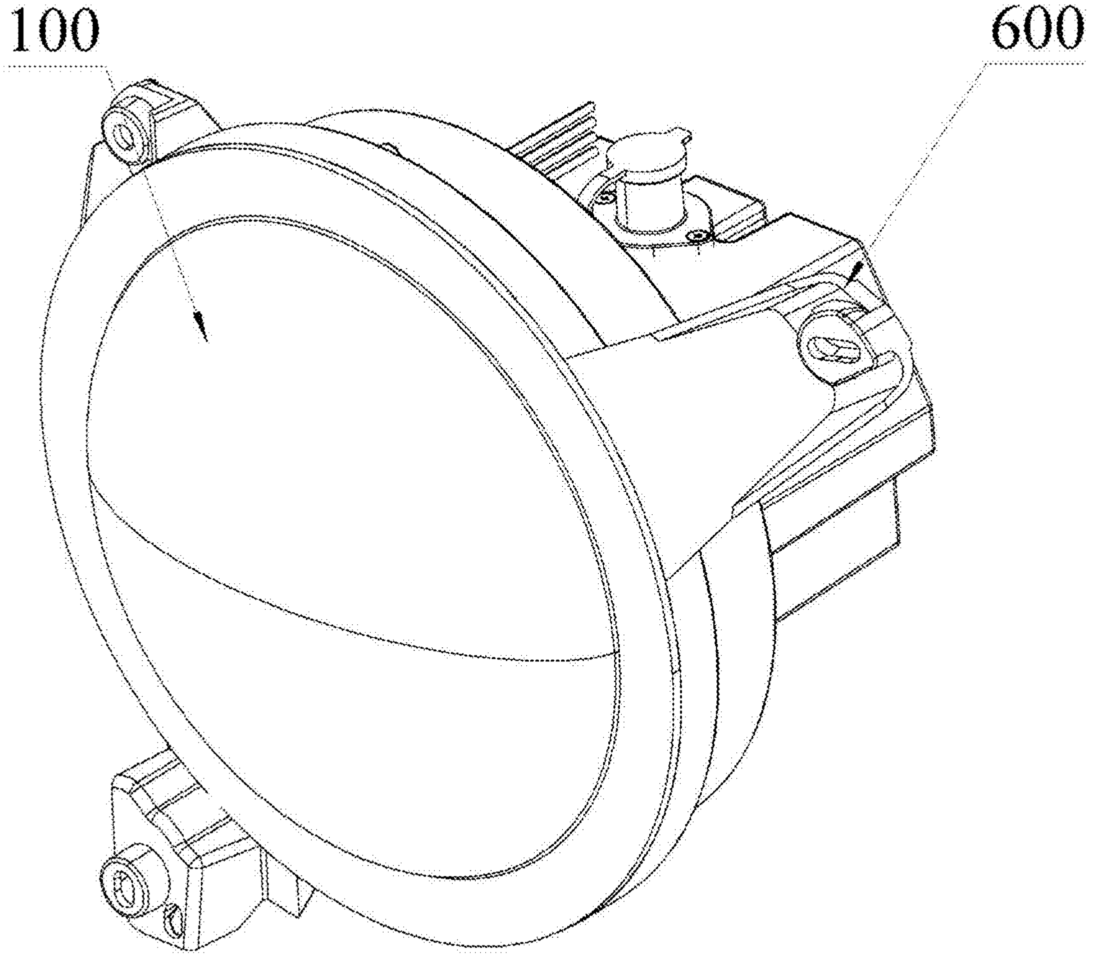
FIG. 1 is a perspective schematic diagram of an embodiment provided by the present disclosure.

Protective housing (100); Connecting buckle (200); Display screen (300); Through hole (301); First circuit board (400); Basic lighting module (500); Rear housing (600); First cavity (601); Second cavity (602); First shell (603); Second shell (604); Connector (605); Heat dissipation hole (606).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

Figure 2:
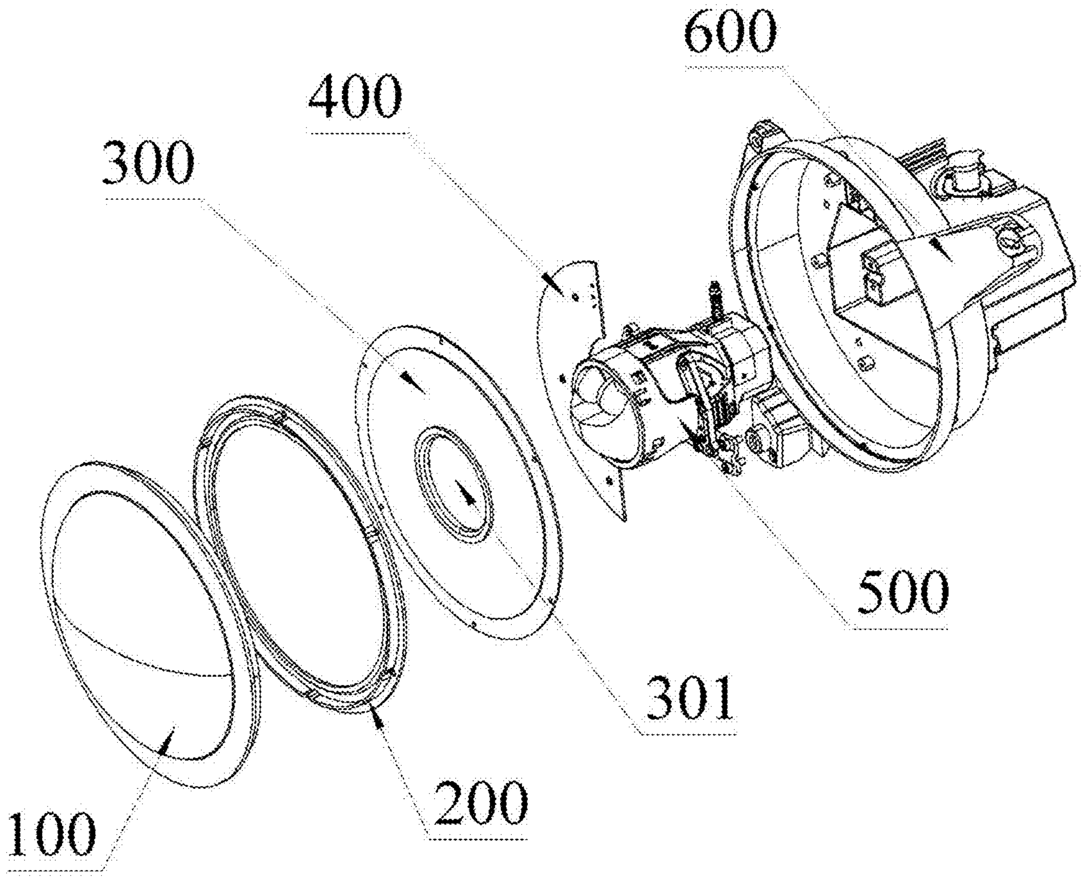
FIG. 2 is an exploded structural schematic diagram of the embodiment in FIG. 1.

As shown in FIGS. 1 and 2, an automotive lighting apparatus includes a protective housing 100 and a rear housing 600. Both the protective housing 100 and the rear housing 600 are made of PC material, featuring high transparency and impact resistance, providing effective protection for internal structures. The light transmittance can reach 80%, ensuring true color reproduction while offering excellent UV aging resistance, with no yellowing even after prolonged outdoor use. The rear housing 600 is designed to match the lamp socket position of the vehicle, ensuring stability during installation. On the side of the rear housing 600 adjacent to the protective housing 100, there is a connecting buckle 200, which is ring-shaped. The protective housing 100 and the rear housing 600 are secured together through the connecting buckle 200, forming a complete headlight shell. This design is easy to install and provides good sealing to prevent rainwater from entering the headlight shell. The rear housing 600 can also be made of other plastic materials such as PMMA or metal materials like aluminum alloy to enhance heat dissipation.

As shown in FIGS. 2 to 6, the rear housing 600 includes an integrally formed first shell 603 and a second shell 604. The first shell 603 has a first cavity 601 inside, while the second shell 604 has a second cavity 602 communicating with the first cavity 601. Inside the second cavity 602, a display screen 300 is installed, which features a through hole 301. The connecting buckle 200 is connected to the end of the display screen 300 adjacent to the protective housing 100, and both the connecting buckle 200 and the display screen 300 are fixed to the second shell 604 through a plurality of bolts.

The display screen 300 offers high flexibility in configuration and form, providing three mainstream materials: LED, OLED, and LCD. LCD materials deliver balanced colors and high cost-effectiveness; LED materials (including LED-backlit LCD and direct-view LED) offer high brightness and durability, making them suitable for high-light environments and large-size requirements; OLED materials, with their high contrast, fast response, and flexible characteristics, meet the needs of high-definition dynamic images and irregular-shaped screen installations. The display screen 300 also supports various shapes such as square, annular perforated (irregular), and triangular. Square screens are highly versatile and fit most standardized spaces, annular perforated screens can conform to curved areas without obstructing critical components, and triangular screens integrate into irregular spaces, enhancing creative visual effects. In practical applications, materials and shapes can be flexibly combined based on usage scenarios and functional requirements, optimizing the experience from visual effects and space utilization to comfort, avoiding the limitations of a single design.

In other embodiments (not shown), the first shell 603 and the second shell 604 adopt a split design. The first shell 603 and the second shell 604 are installed through a buckle structure or bolts. The split design of the first shell 603 and the second shell 604 facilitates maintenance and assembly. When issues arise, it simply needs to separate the first shell 603 and the second shell 604 to allow for the repair or replacement of different components.

As shown in FIGS. 2 to 6, it also includes a first circuit board 400 and a basic lighting module 500. The first circuit board 400 is electrically connected to the display screen 300, and the basic lighting module 500 provides standard automotive lighting functions. At least part of the light from the basic lighting module 500 passes through the through hole 301 to achieve lighting functionality. The first circuit board 400 drives the display screen 300 to operate. The first circuit board 400 is located inside the second cavity 602, and serves as the control core.

Specifically, one end of the basic lighting module 500 is placed inside the first cavity 601, while the other end passes through the through hole 301 and is located inside the second cavity 602, facilitating the use of the basic lighting module 500.

Figure 3:
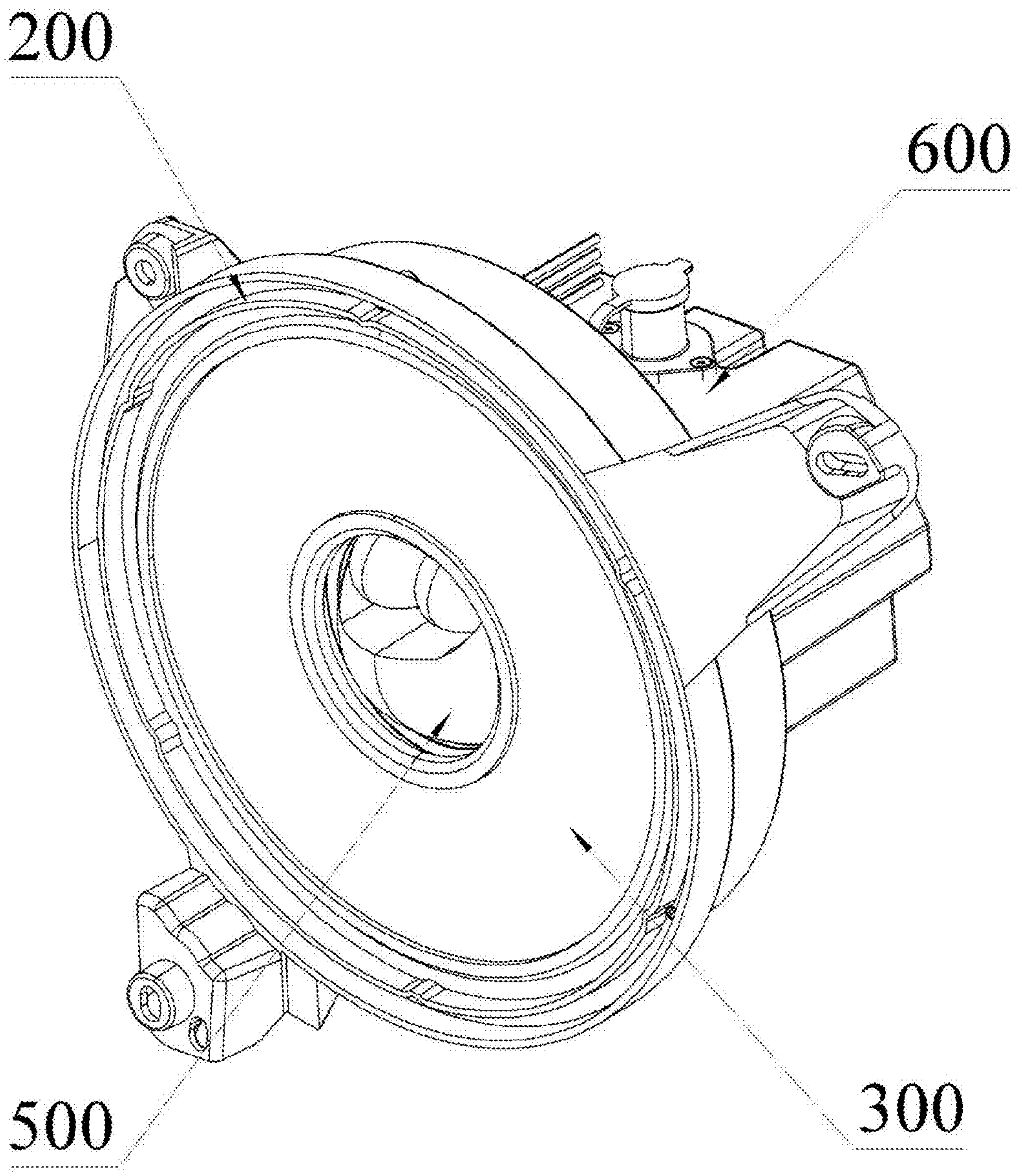
FIG. 3 is a structural schematic diagram of the connecting buckle and LED display screen in the embodiment shown in FIG. 1.
Figure 4:
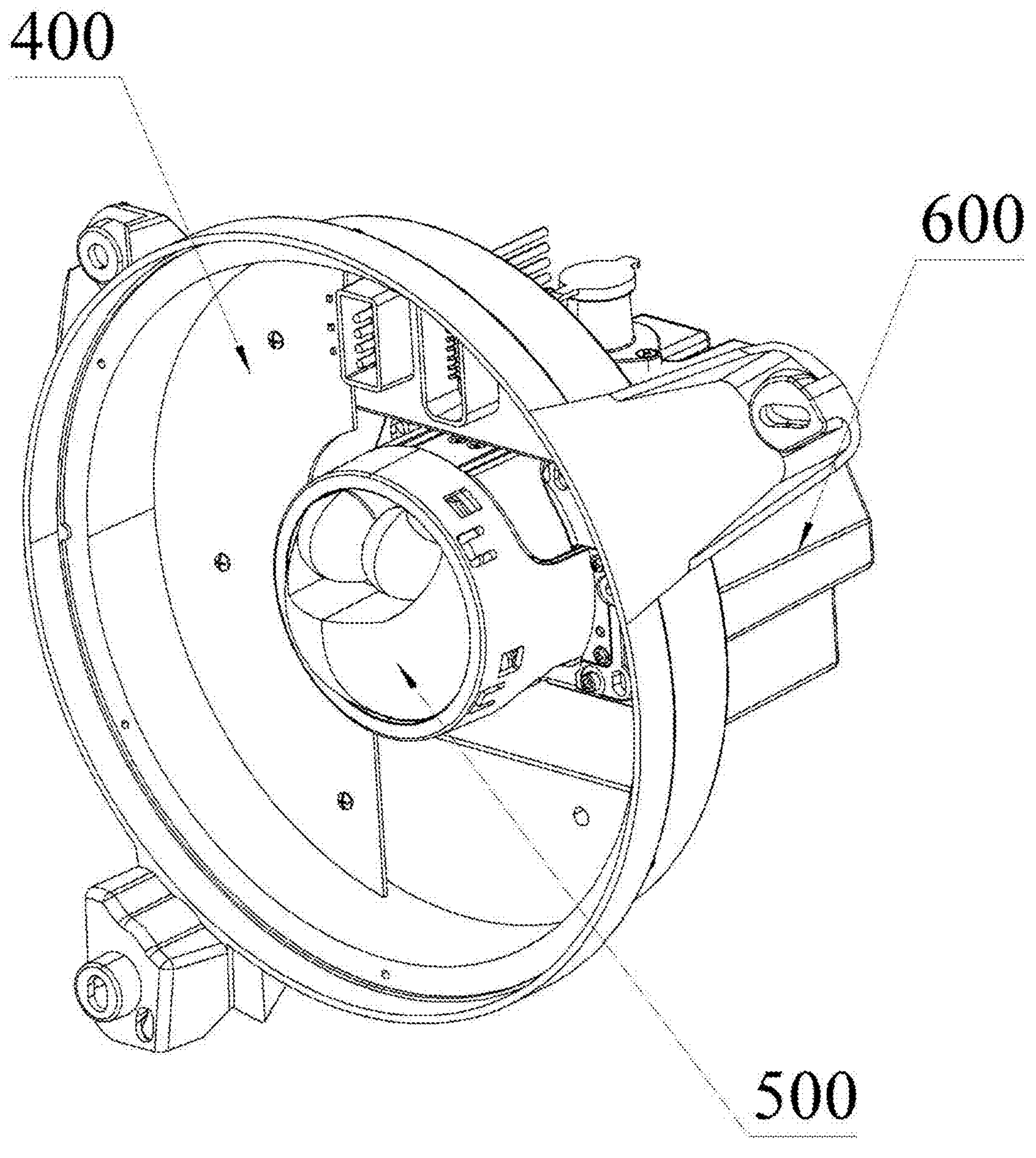
FIG. 4 is a structural schematic diagram of the first circuit board and basic lighting module in the embodiment shown in FIG. 1.
Figure 5:
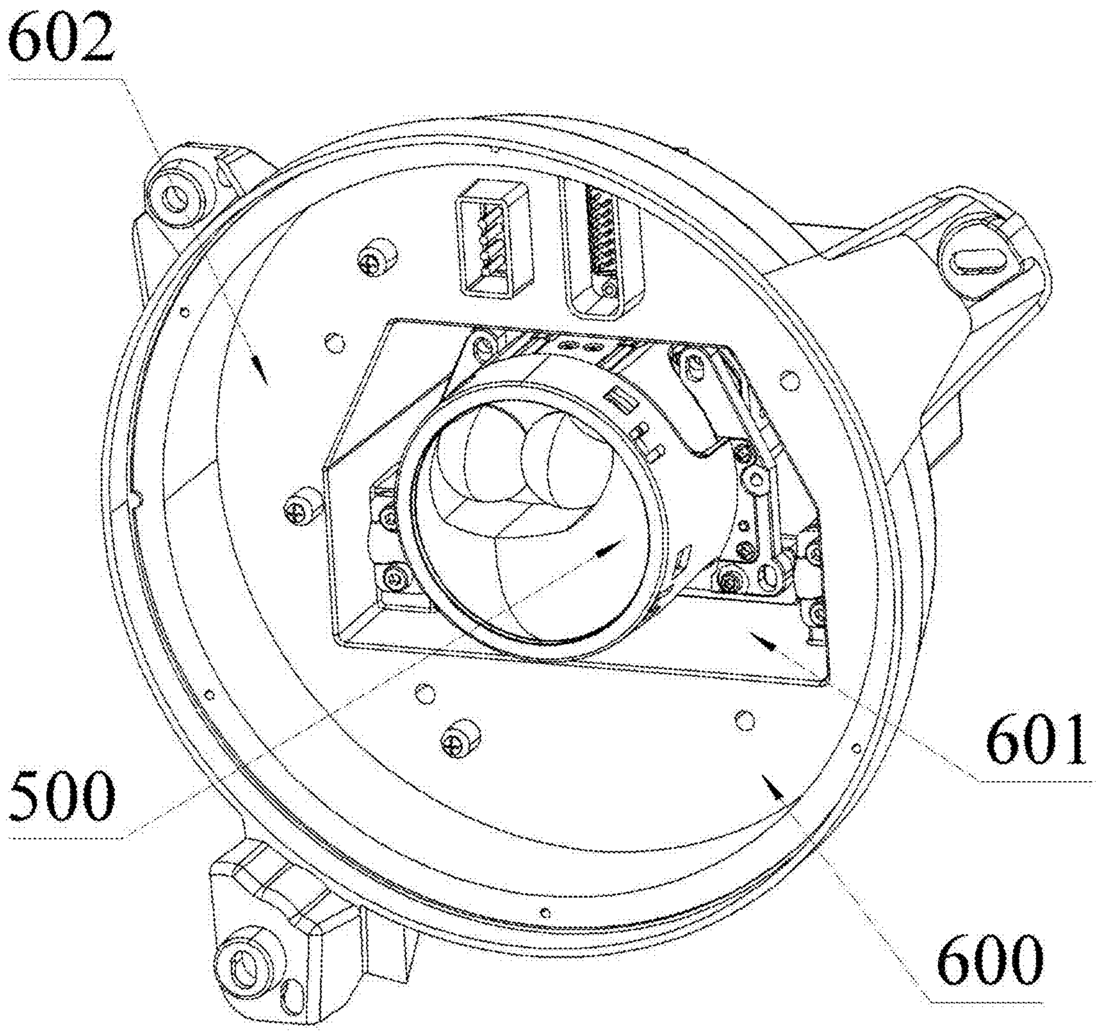
FIG. 5 is a structural schematic diagram of the first shell and second shell in the embodiment shown in FIG. 1.
Figure 6:
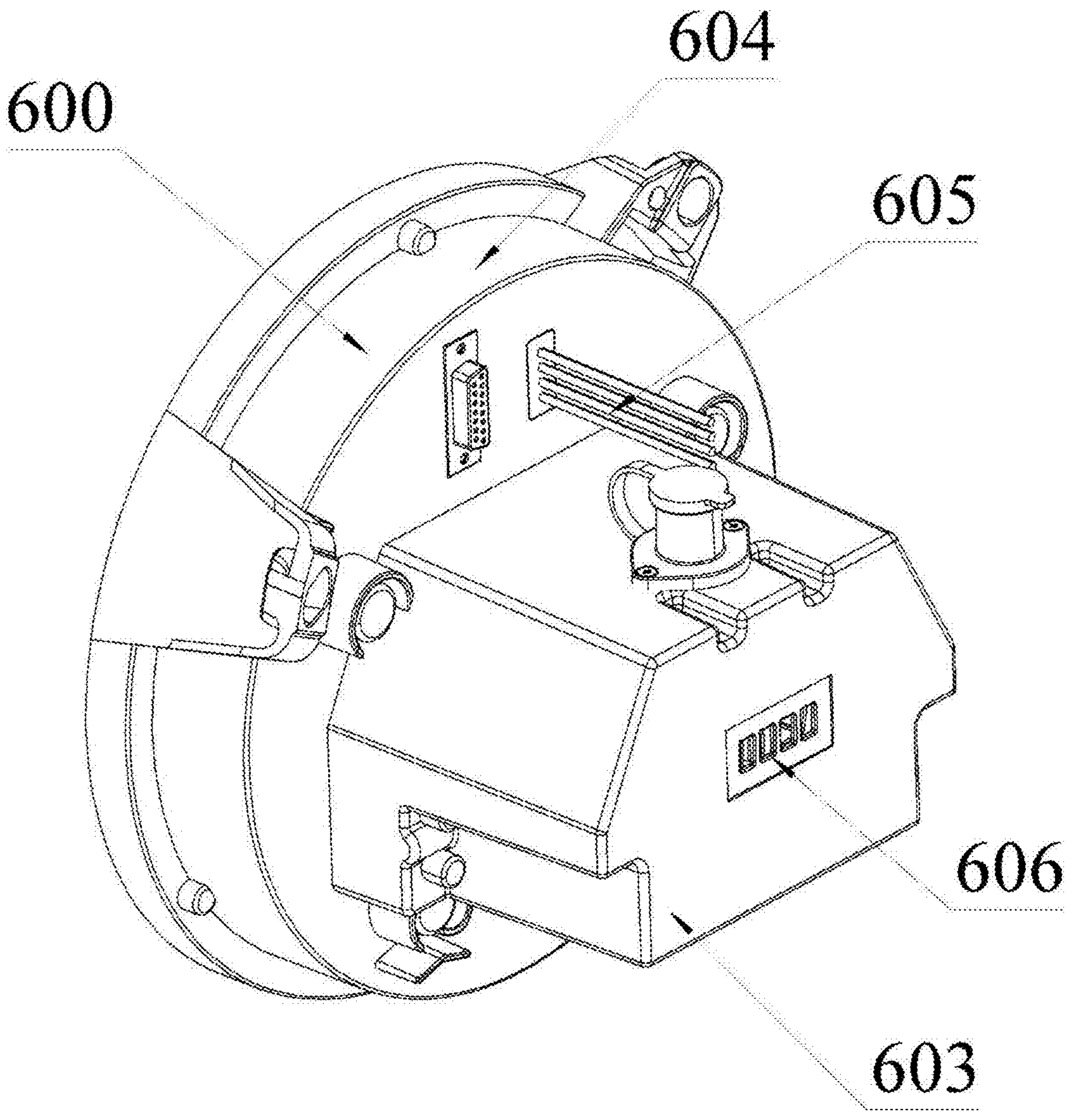
FIG. 6 is a structural schematic diagram of the first shell and second shell from another perspective in the embodiment shown in FIG. 1.

As shown in FIGS. 3, 4, and 6, the outer side of the second shell 604 is equipped with a connector 605, and the interior of the second shell 604 houses a control box connected to the connector 605. The control box is electrically connected to both the first circuit board 400 and the basic lighting module 500. The connector 605 is connected to the automotive power supply through an external wiring harness to supply power and transmit signals to the control box. The outer side of the second shell 604 is also provided with heat dissipation holes 606, which expel heat generated by the display screen 300 and the basic lighting module 500, preventing damage to these components due to excessive temperature inside the rear housing 600.

It is understandable that the control box contains a chip and a second circuit board. The second circuit board is responsible for signal reception and integrated control circuits within the control box, while the chip handles signal judgment and processing. Both the display screen 300 and the basic lighting module 500 are controlled by the control box. When the vehicle activates a turn signal, the control box identifies the signal and controls the basic lighting module 500 to flash.

The control circuit in this application operates in a dual-signal mode (vehicle status signals and custom display signals), with the vehicle status signals having the highest priority. Here, the vehicle status signals are electrical signals, while the custom display signals are wireless signals. When the system detects electrical signals from the signal source, it immediately interrupts all wireless signal operations to prioritize executing its instructions. Only when no electrical signal is present will the system process wireless signals and execute corresponding multimedia commands. When using wireless signals to control the control box, users can select, upload, or play desired content, treating the display screen 300 as a regular screen.

Figure 7:
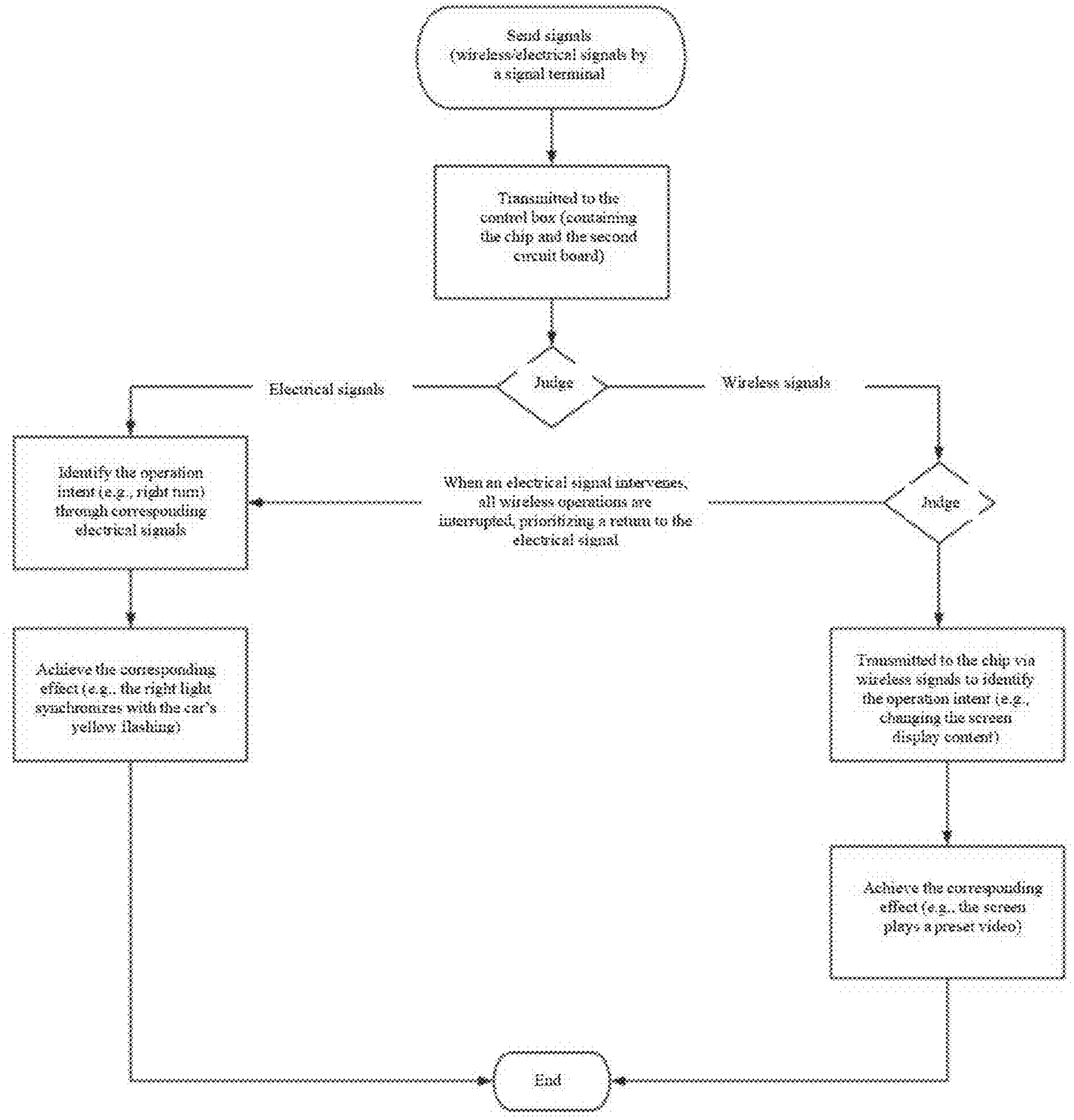
FIG. 7 is a system block diagram of this embodiment.

Specifically, as shown in FIG. 7, when the signal terminal sends a signal, the signal is transmitted to the control box. The chip inside the control box determines whether the signal is a wireless signal or an electrical signal. If the signal is an electrical signal, the chip identifies the operator's intention (e.g., right turn) through the corresponding electrical signal and then transmits the electrical signal to the basic lighting module 500 to achieve the corresponding effect (e.g., the right light synchronizes with the car's yellow flashing). If the signal is a wireless signal, the system first checks whether there is any electrical signal interference. If an electrical signal is present, all wireless signal operations are interrupted, and the electrical signal is prioritized to identify the operator's intention (e.g., right turn). If no electrical signal is present, the wireless signal is transmitted to the chip, which identifies the operation intent (e.g., changing the display content) and sends the wireless signal to the first circuit board 400. The first circuit board 400 then controls the display screen 300 to achieve the corresponding effect (e.g., playing preset video material on the display screen 300).

Wireless signals include Bluetooth signals, APP signals, WIFI signals, and vehicle-mounted system signals. By controlling the display screen 300 to play preset content through various wireless signals, the convenience of the display screen 300 is improved.

Additionally, the first circuit board 400 is equipped with a memory. When a wireless signal is transmitted to the first circuit board 400, it can execute preset instructions based on the programs stored in the memory, causing the display screen 300 to play preset videos. If the display screen 300 receives wireless signals but the first circuit board 400 has no preset instructions, the wireless signals will transmit the server's preset videos to the display screen 300 for playback.

In other embodiments (not shown), the display screen 300 can also be connected to the vehicle-mounted system through wired signals (electrical signals). Wired connections are more stable, avoiding signal instability or interruptions during use.

In other embodiments (not shown), the display screen 300 features a detachable modular design. The inner wall of the second cavity 602 is equipped with guide slots and electrical contact points, while the sides of the display screen 300 correspondingly have guide ribs and contact pins. Without disassembling the entire headlight assembly, users or maintenance personnel can slide out the old display module and insert a new one through a dedicated access port (which can be located on the rear housing 600 or protective housing 100), enabling quick replacement or upgrades. This design is particularly suitable for commercial vehicles or fleet management, allowing easy replacement of screens displaying different brand logos or information.

In other embodiments (not shown), the display screen 300 is not a flat ring but a three-dimensional curved ring adapted to the inner surface of the protective housing 100. This display screen is composed of numerous tiny, flexible LED chips mounted on a flexible circuit board, allowing it to perfectly conform to the complex curves of the headlight housing, providing superior integrated visual effects and a wider viewing angle. Additionally, the periphery of the through hole 301 can be designed with a tapered surface at a certain angle, making the installation of the basic lighting module 500 more streamlined and reducing optical interference.

In other embodiments (not shown), the rear housing 600 (particularly those made of aluminum alloy) is further integrated with an active cooling system. This system includes a thermoelectric cooler (TEC) or a miniature fan attached to the back of the first circuit board 400 or the display screen 300. The heat dissipation hole 606 is optimized into a water-resistant labyrinth structure, ensuring cooling efficiency while effectively preventing rainwater and dust from entering. The control box can monitor internal temperatures in real-time and automatically activate the active cooling system when temperatures exceed the threshold, ensuring components operate at optimal temperatures and extending their lifespan.

In other embodiments (not shown), an environmental sensing and decision-making layer is added to the original dual-signal control logic. The basic lighting module 500 is equipped with additional environmental sensors (such as cameras, light sensors, and rain sensors), which are electrically connected to the control box. The chip (or second circuit board) inside the control box runs an intelligent display decision algorithm: Safety Priority Mode: when environmental sensors detect conditions like rain, fog, or dark rural roads, even if the APP has set custom animations, the system will automatically force the display screen 300 to reduce brightness or switch to high-contrast safety symbols (e.g., "Keep Distance" arrows) to avoid glare interference for other drivers. Interaction Mode: when the camera identifies pedestrians ahead (by image recognition algorithms), the display screen 300 can project crosswalks or warning icons on the ground while maintaining headlight functionality, enabling interaction with pedestrians. Scenario-Adaptive Mode: when the vehicle is parked, the APP can fully control the screen content; at low speeds, the display is limited to simple turn or status information; at high speeds, all non-essential custom displays are disabled, retaining only the highest-priority electrical signal responses (e.g., turn indicators).

In other embodiments (not shown), the basic lighting module 500 is replaced or supplemented by a high-resolution pixelated lighting module. Dynamic lighting functionality: it enables adaptive driving beam (ADB) capabilities, automatically dimming the light in areas of oncoming vehicles to avoid glare. Programmable light patterns: the low-beam illumination range and shape can be dynamically adjusted based on road conditions (urban, highway, off-road). Integrated road projection: it can synchronize with the display screen 300 to project auxiliary information (e.g., navigation arrows, speed) onto the road ahead through the pixelated module, achieving deep integration with the driving environment. In this case, the ring-shaped display screen 300 is primarily used for external interaction and brand display.

In other embodiments (not shown), an energy optimization module and a fault diagnosis module are added inside the rear housing 600. For energy optimization: A flexible thin-film solar panel is embedded on the top of the rear housing 600. The solar panel is connected to an energy storage capacitor through a voltage regulator module. When the vehicle is parked and the light intensity is ≥5000 lux, the solar panel can charge the energy storage capacitor. After the vehicle is turned off, the capacitor can maintain low-power display (e.g., time, vehicle status) on the display screen 300 for up to 4 hours, avoiding battery drain. Meanwhile, the first circuit board 400 incorporates a low-power mode, automatically cutting off non-essential power supply to the display screen 300 and control box when the vehicle is off for more than 10 minutes, retaining only the signal wake-up module (power consumption ≤10 mA). The control box is equipped with current-voltage sensors and a fault diagnosis chip. The sensors collect real-time operational parameters (e.g., current, voltage, temperature) of the display screen 300, basic lighting module 500, and first circuit board 400. Upon detecting anomalies (e.g., sudden current drop in the display screen, lens temperature exceeding 80° C.), the diagnosis chip immediately sends fault codes to the vehicle's central control screen through CAN bus, while the display screen 300 shows corresponding fault icons (e.g., "Display Fault," "Cooling Anomaly") for quick troubleshooting. Additionally, historical fault records and maintenance suggestions can be accessed through an app, reducing maintenance costs.

In other embodiments (not shown), a Vehicle-to-Everything (V2X) communication module and multimodal interaction functions are added to the original dual-signal-source setup. The control box is internally equipped with a V2X communication chip (supporting LTE-V2X protocol), enabling real-time interaction with preceding vehicles and roadside units (RSUs) for traffic condition information: Upon receiving an "emergency braking" V2X signal from a preceding vehicle, the control box immediately triggers the display screen 300 to flash a red warning pattern (a frequency of 2 Hz), while switching the basic lighting module 500 to "hazard light mode" to alert trailing vehicles in advance. When an RSU transmits a "roadwork ahead" signal, the display screen 300 can simultaneously show the distance to the construction zone (e.g., "Roadwork 500 m ahead"), achieving driving assistance functionality. Additionally, new multimodal interaction methods are introduced: Voice control—the control box interfaces with the onboard voice assistant (e.g., in-car AI system), allowing drivers to command the display screen 300 to show preset animations through voice instructions (e.g., "Switch display screen 300 to welcome mode"). Gesture control—a miniature infrared gesture sensor is installed on the outer side of the second shell 604, enabling users to switch the display content of display screen 300 by performing a "swipe left/right" gesture within a 50-100 mm range in front of the light body, or pause custom playback and switch to vehicle status display mode with a "fist clench" gesture.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. An automotive lighting apparatus, comprising:
a lamp housing;
a basic lighting module arranged within the lamp housing and electrically connected to an automotive power supply, configured to respond to vehicle status signals from a vehicle main control system for providing road lighting and vehicle status display; and
a display screen arranged within the lamp housing and electrically connected to the basic lighting module, configured to respond to command signals from a user terminal control to display dynamic visual content independently of the vehicle status signals,
wherein the lamp housing comprises a protective housing and a rear housing that are detachably connected, and the basic lighting module is arranged within the rear housing.

2. The automotive lighting apparatus according to claim 1, wherein a connecting buckle is connected to an end of the display screen adjacent to the protective housing, and the connecting buckle and the display screen are fixed to the rear housing through a plurality of bolts.

3. The automotive lighting apparatus according to claim 1, wherein the display screen is provided with a through hole, and at least part of light from the basic lighting module passes through the through hole.

4. The automotive lighting apparatus according to claim 1, wherein the rear housing comprises a first shell and a second shell that are of an integrated molding structure, the first shell has a first cavity inside, and the second shell has a second cavity inside.

5. The automotive lighting apparatus according to claim 4, wherein heat dissipation holes are arranged outside the rear housing for dissipating heat generated by the basic lighting module and the display screen within the second cavity.

6. The automotive lighting apparatus according to claim 1, wherein the rear housing comprises a first shell and a second shell that are of a split design, and the first shell and the second shell are detachably connected through a buckle structure or bolts.

7. The automotive lighting apparatus according to claim 1, further comprising a control unit electrically connected to the display screen and the basic lighting module, wherein the control unit comprises a control box, a connector is arranged outside the rear housing, and the control box is arranged inside the rear housing; and the connector is electrically connected to the automotive power supply through an external wiring harness, and the connector being electrically connected to the control box to achieve power supply and signal transmission, wherein the signals comprise electrical signals and wireless signals.

8. The automotive lighting apparatus according to claim 7, wherein the control unit further comprises a first circuit board electrically connected to the display screen and the control box, respectively; and the control box internally comprises a chip for identifying a type of the electrical signals or the wireless signals and determining signal priorities and a second circuit board for signal processing.

9. The automotive lighting apparatus according to claim 8, wherein the wireless signals comprise Bluetooth signals, APP signals, WIFI signals, and vehicle-mounted system signals, and the wireless signals are configured to allow a user to select, upload, or play display content of the display screen.

10. The automotive lighting apparatus according to claim 9, wherein the first circuit board is located inside the rear housing, and when transmitting wireless signals, the control box controls an operation of the display screen through the first circuit board.

11. An automotive lighting apparatus, comprising:

a lamp housing;

a basic lighting module located inside the lamp housing and electrically connected to an automotive power supply, configured to respond to vehicle status signals from a vehicle main control system for providing road lighting and vehicle status display; and a display screen located inside the lamp housing and electrically connected to the basic lighting module, configured to execute preset command signals to display dynamic visual content independently of the vehicle status signals, wherein the display screen is provided with a through hole, and at least part of light from the basic lighting module passes through the through hole.

12. The automotive lighting apparatus according to claim 11, further comprising a control box, a first circuit board and a connector, wherein the connector is located on the housing, while the control box and the first circuit board are both located inside the housing.

13. The automotive lighting apparatus according to claim 12, wherein the connector is electrically connected to the automotive power supply through an external wiring harness, and the connector is electrically connected to the control box to achieve power supply and signal transmission.

14. The automotive lighting apparatus according to claim 13, wherein the signals comprise vehicle status signals and custom display signals; and the vehicle status signals are electrical signals, while the custom display signals are wireless signals, comprising Bluetooth signals, APP signals, WIFI signals, and vehicle-mounted system signals, and the wireless signals are configured to allow a user to select, upload, or play display content of the display screen.

15. The automotive lighting apparatus according to claim 14, wherein the control box internally comprises a chip for identifying a type of the electrical signals or the wireless signals and determining signal priorities and a second circuit board for signal processing, transmitting the electrical signals to the basic lighting module and the wireless signals to the first circuit board, and controlling an operation of the display screen.

16. The automotive lighting apparatus according to claim 15, wherein a memory is provided on the first circuit board; and when the wireless signals are transmitted to the first circuit board, the first circuit board is capable of executing preset commands based on a stored program, enabling the display screen to play preset videos; and when the display screen receives the wireless signals but the first circuit board has no preset commands, the wireless signals transmit videos preset by a server to the display screen for playback.

17. An automotive lighting apparatus, comprising:

a lamp housing;

a basic lighting module arranged inside the lamp housing, configured to respond to vehicle status signals from a vehicle main control system for providing road lighting and vehicle status display; and a display screen arranged inside the lamp housing, configured to execute preset command signals to display dynamic visual content independently of the vehicle status signals;

wherein the display screen is provided with a through hole, and at least part of light emitted by the basic lighting module passes through the through hole.

18. The automotive lighting apparatus according to claim 17, further comprising a first circuit board arranged inside the lamp housing, electrically connected to the display screen, with a memory provided on the first circuit board, wherein when wireless signals are transmitted to the first circuit board, the first circuit board is capable of executing preset commands based on a program stored in the memory, enabling the display screen to play preset videos.

* * * * *